United States Patent [19]

Jarvis

[11] 4,338,852
[45] Jul. 13, 1982

[54] BUMP STOP FOR TRUNNION-MOUNTED WEAPON

[75] Inventor: Richard L. Jarvis, Harford County, Md.

[73] Assignee: The United States of America as represented by the Secretary of the Army, Washington, D.C.

[21] Appl. No.: 150,872

[22] Filed: May 19, 1980

[51] Int. Cl.³ ............................................ F41D 11/24
[52] U.S. Cl. .................... 89/37 E; 89/42 R; 89/44 R
[58] Field of Search ............... 89/42 R, 44 R, 37 E, 89/37 H, 37 C

[56] References Cited

U.S. PATENT DOCUMENTS

| 2,491,539 | 12/1949 | Windham | 89/44 R |
| 3,244,076 | 4/1966 | Wey | 89/37 H |
| 3,430,534 | 3/1969 | Agren | 89/42 R |
| 3,434,383 | 3/1969 | Rocha | 89/42 R |

Primary Examiner—Donald P. Walsh
Attorney, Agent, or Firm—Peter A. Taucher; John E. McRae; Nathan Edelberg

[57] ABSTRACT

A bump stop for a trunnion-mounted weapon that includes a torsion bar shock absorber carried by the receiver portion of the weapon for absorbing shock loads as the weapon nears the limits of its upward and downward motion. The bump stop is advantageously characterized by compactness, high energy-absorbing capacity, durability, insensitivity to temperature or other environmental variations, and usability in two directions, up and down.

6 Claims, 3 Drawing Figures

BUMP STOP FOR TRUNNION-MOUNTED WEAPON

The invention described herein may be manufactured, used, and licensed by or for the Government for governmental purposes without payment to me of any royalty thereon.

BACKGROUND AND SUMMARY OF THE INVENTION

The invention is directed to a resilient bump stop carried by the receiver portion of a trunnion-mounted gun for absorbing shock energy as the gun nears the limits of its upward or downward motion. The bump stop is designed to handle relatively high shock loads from a relatively heavy gun weighing in excess of 2,000 pounds and having a relatively fast swing motion in the elevational plane as it nears the limits of its motion.

THE DRAWINGS

Figure 1:
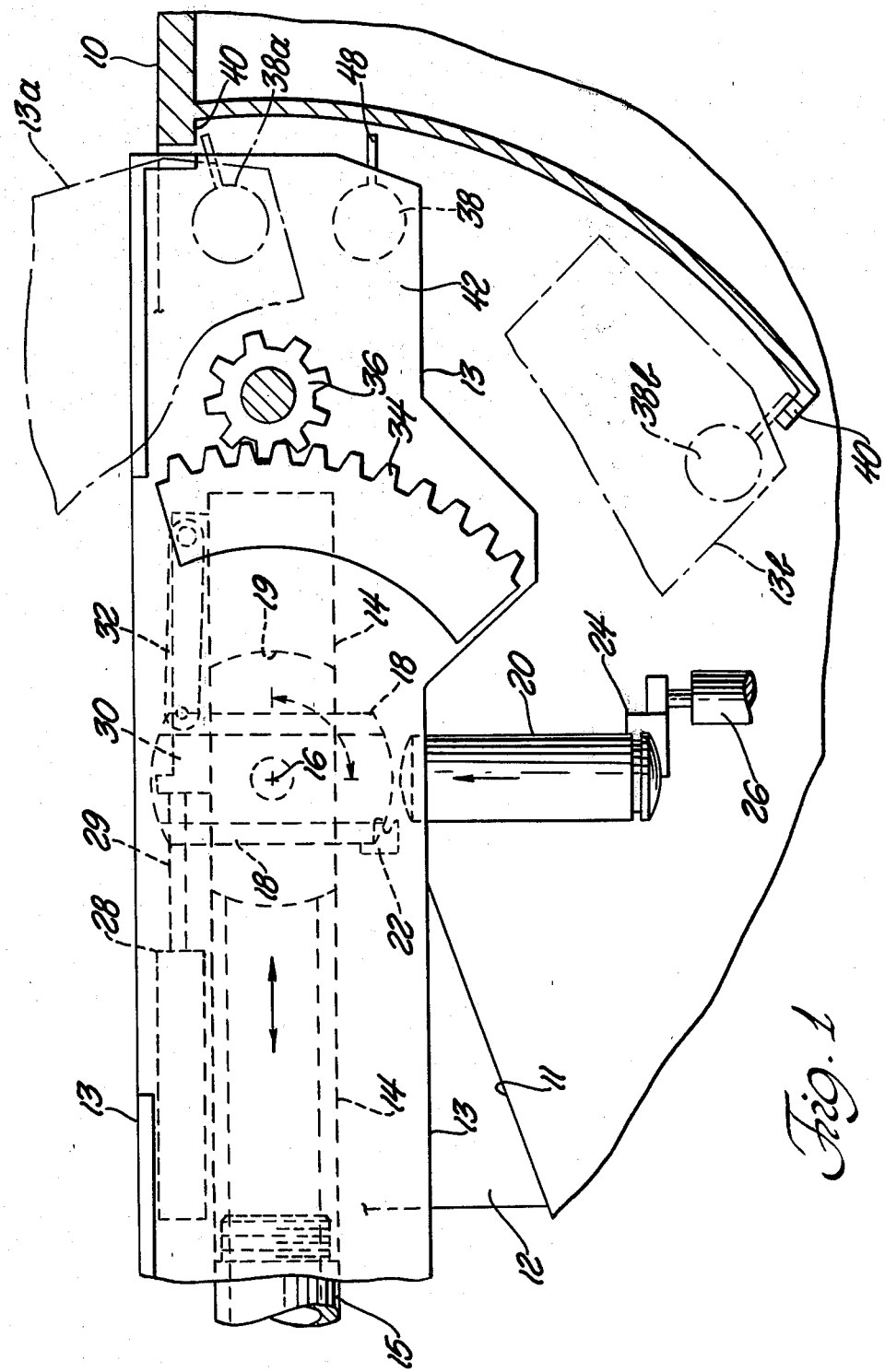
FIG. 1 is a fragmentary elevational view of a trunnion-mounted gun incorporating the present invention therein.

In the drawings the following reference numerals are applied to the corresponding listed components:
10—turret roof
11—turrent front profile
12—trunnion
13—receiver
14—breech
15—gun barrel
16—swing axis for receiver 14 and chamber 18
18—chamber for ammunition round
19—chamber clearance space within receiver
20—ammunition round
22—round retainer clip
24—round feeder ram
26—up-feed cylinder
28—chamber rotation fluid cylinder
29—piston rod
30—slide carried by receiver
32—link between slide and chamber 18
34—sector gear
36—driver pinion gear
38—shock absorber
40—stationary stop surfaces
42—receiver side wall
44—receiver side wall
46—tube
48—striker arm carried by tube 46
50—torsion bar assembly
52—socket member
54—socket member
55—weld
56—mounting screws
58—cavity
60—sleeve bearing
62—sleeve bearing
64—stub shaft
66—stiffener brace The gun system shown in FIG. 1 can be adjusted around swing axis 16 in the elevational plane by applying motor torque to gear 36 suitably mounted in the turret of the vehicle, which may be a tank or similar armored track vehicle. A sector gear 34 carried by the gun receiver 13 produces the necessary swinging motion around the trunnion axis 16 to move the gun between its zero elevation attitude shown in full lines upwardly to a negative elevational attitude designated by numeral 13a or a positive elevational attitude designated by numeral 13b. The described motion is limited by the stationary stops 40 which are contacted by a striker arm 48 carried by a rotary shock absorber 38 suitably mounted in the gun receiver 13.

The details of the gun are not part of the present invention. However, for illustration purposes I show a gun having a chamber 18 rotatably mounted in a clearance space 19 within a breech of housing 14; the rotation axis for chamber 18 coincides with trunnion axis 16, but the chamber has no connection with the trunnion shaft. After each round is fired through barrel 15 chamber 18 is rotated to its illustrated vertical attitude for up-feed of the next ammunition round 20 into the chamber and simultaneous ejection of the spent round casing upwardly out of the chamber; fluid cylinder 26 may be used for this operation. Chamber 18 is returned to its firing position by actuating a fluid cylinder 28 to draw slide 30 leftwardly so that associated link 32 swings chamber 18 counterclockwise around axis 16. The gun is capable of being fired and reloaded in any elevational attitude between the limits designated by numerals 13a and 13b in FIG. 1. Conventional recoil devices trained between breech 14 and receiver 13 absorb the recoil forces.

Figure 2:
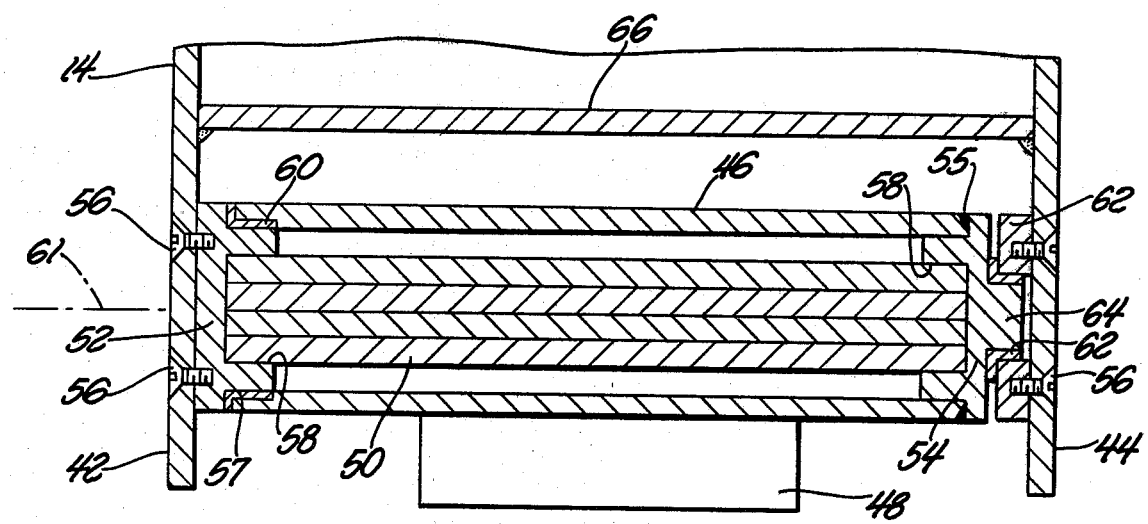
FIG. 2 is a sectional view of a shock absorber used in the FIG. 1 gun and taken along line 2—2 in FIG. 3.
Figure 3:
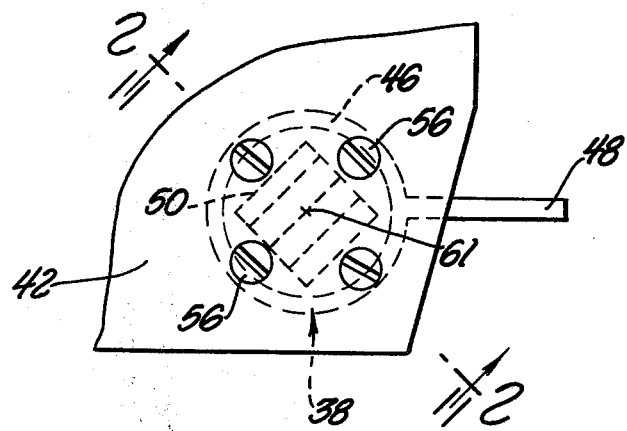
FIG. 3 is a fragmentary side elevational view of the receiver in the FIG. 1 gun and showing the profile of the FIG. 2 shock absorber.

As previously indicated, my invention relates to the shock absorber 38 shown more particularly in FIGS. 2 and 3. The illustrated shock absorber comprises a first socket member 52 affixed to the inner surface of gun receiver side wall 42 by four screws 56. The outer peripheral surface 57 of the socket member 52 is circular to enable the surrounding tube 46 to rotate around socket member axis 61. The tube 46 has a sleeve bearing 60 press fit therein to slide on surface 57 of member 52. The other end of tube 46 is affixed to a second socket member 54, as by welding at 55. Socket member 54 carries a stub shaft 64 having a rotary fit in a sleeve bearing 62 that is affixed to receiver wall 44 by four screws 56.

Each socket member 52 or 54 has a noncircular square cavity 58 therein for tight fit on an end area of a torsion bar assembly 50. Preferably torsion bar assembly 50 comprises at least four flat rectangular spring strips facially engaged with one another to form a square-cross section torsion bar assembly. The diagonal distance measured across the opposite corners of the square shown in FIG. 3 is only slightly less than the internal diameter of tube 46 so that a substantial portion of the tube interior space is occupied by the torsion bar assembly. It will be seen by reference to FIG. 2 that socket member 52 serves as a first anchor means for anchoring the left end of torsion bar 50 onto receiver wall 42. Socket member 54 serves as a second anchor means for anchoring the right end of torsion bar 50 to the tube 46. The tube is effectively rotationally mounted for swing motion around axis 61 by the two sleeve bearings 60 and 62.

Tube 46 carries a plate-like striker arm 48 arranged to contact the aforementioned stationary stops 40 as the gun receiver nears the limits of its motion, particularly illustrated in FIG. 1. As the striker arm 48 strikes the stop 40 the inertia force of the still-moving gun causes the striker arm to impart a rotary motion to tube 46. The right end of torsion bar 50 is effectively anchored to the right end of tube 46 so that bar 50 undergoes a twisting motion around axis 61, thereby resiliently absorbing the inertia force and bringing the gun receiver to a stop without fracture or deformation of the gun components.

The shock absorber is relatively compact in the torsion bar 50 extends substantially the full length of the space between receiver walls 42 and 44, with a minimum of unused space for the anchoring devices. The device is relatively durable in that tube 46 is supported rotationally at both of its ends, as at 60 and 62, whereby the tube is not apt to bend or deform in response to the shock force imparted by striker arm 48. Another advantageous feature is the fact that striker arm 48 is operable when the gun reaches either its upper or lower limit of travel, such that a single shock absorber 38 can be used. The shock absorber occupies a relatively small space for a given energy-absorbing capacity. All of the components are preferably metallic, and thus insensitive to major extremes in temperature or moisture that can adversely affect the service life of elastomeric materials. In one instance an illustrated torsion bar assembly approximately fifteen inches long and two inches wide on a side was effective to decelerate a relatively large weapon from a maximum speed of one radian per second. Weapon inertia was approximately 1,500 lb-ft-sec$^2$, which is equivalent to a total kinetic energy of about 9,000 inch-lb.

I wish it to be understood that I do not desire to be limited to the exact details of construction shown and described for obvious modification will occur to a person skilled in the art.

I claim:

1. In a trunnion-mounted weapon that includes a receiver adapted to swing in the elevational plane between stationary stops: the improvement comprising a torsion bar shock absorber carried by the receiver for resiliently absorbing shock loads as the receiver nears the limits of its swing motion; said shock absorber comprising a tube rotatably mounted on the receiver for motion around an axis parallel to the receiver swing axis, a striker arm carried by the tube for engagement with the aforementioned stationary stops to impart rotary motion to the tube, torsion bar means located within the tube, a first anchor means interconnecting one end of the torsion bar means and the receiver, and a second anchor means interconnecting the other end of the torsion bar means and the corresponding end of the tube, the shock absorber being constructed so that shock is transmitted from the striker arm to the tube, thence through the second anchor means to the torsion bar means.

2. The improvement of claim 1: said first and second anchor means consisting, respectively, of first and second socket members, each having a noncircular cavity fitted to an end of the torsion bar means, and a circular outer peripheral surface; one end of the tube having a first sleeve bearing fitted therein for rotary sliding motion on the outer peripheral surface of the first socket member, the other end of the tube being affixed to the outer peripheral surface of the second socket member.

3. The improvement of claim 2 and further comprising a second sleeve bearing mounted on the receiver at the other end of the tube, and a stub shaft projecting from the second socket member into the second sleeve bearing for rotationally supporting the second socket member and associated end of the tube.

4. The improvement of claim 3 wherein the receiver includes two spaced parallel walls, the shock absorber being arranged in the space between the receiver walls so that the first socket member is affixed to one of the receiver walls and the second bearing is affixed to the other receiver wall.

5. The improvement of claim 3 wherein the torsion bar means has a square-cross section centered on the tube axis; the diagonal distance measured across the corners of the square being only slightly less than the internal diameter of the tube, whereby a substantial portion of the tube interior space is occupied by the torsion bar means.

6. The improvement of claim 5 wherein the torsion bar means comprises at least four flat rectangular spring strips facially engaged with one another to form a square-cross section torsion bar assembly.

* * * * *